United States Patent

Rohlfing

[11] Patent Number: 5,990,935
[45] Date of Patent: Nov. 23, 1999

[54] METHOD FOR MEASURING CAMERA AND LENS PROPERTIES FOR CAMERA TRACKING

[75] Inventor: Thomas R. Rohlfing, Salt Lake City, Utah

[73] Assignee: Evans & Sutherland Computer Corporation, Salt Lake City, Utah

[21] Appl. No.: 08/832,756

[22] Filed: Apr. 4, 1997

[51] Int. Cl.⁶ .................................................. H04N 7/18
[52] U.S. Cl. ........................... 348/39; 348/139; 348/42; 348/135; 348/36
[58] Field of Search ................................. 348/180, 187, 348/189, 190, 140, 139, 153, 36, 39, 42, 46, 47; 395/125, 119; 382/28, 62, 64

[56] References Cited

U.S. PATENT DOCUMENTS

5,285,397 2/1994 Heier et al. ............................... 348/139
5,495,576 2/1996 Ritchey ..................................... 395/125

Primary Examiner—Anand S. Rao
Attorney, Agent, or Firm—Thorpe, North & Western, LLP

[57] ABSTRACT

A method and apparatus for performing a lens calibration procedure which is executed for each camera and lens pair. The calibration procedure is performed to determine the camera and lens nodal point offset and field of view, plus image offset in both the horizontal and vertical directions as a function of lens zoom and focus settings. The method includes the step of providing apparatus which enables the semi-automatic and rapid entry of data points representing lens zoom and focus setting information, thereby eliminating a source of human error. The general method includes the steps of creating a real environment and an identical virtual environment which is a copy of the real environment. The image from the virtual environment is superimposed on a monitor displaying the real environment. The camera's zoom and focus rings are incremented through a plurality of values by discrete steps. For each value, the virtual environment's settings are manipulated until the real and virtual images are identical. The values from the virtual environment are then recorded as a data point corresponding to a specific camera lens zoom and focus setting. A plurality of data points are then recorded to create the calibration dataset.

22 Claims, 6 Drawing Sheets

METHOD FOR MEASURING CAMERA AND LENS PROPERTIES FOR CAMERA TRACKING

BACKGROUND

1. The Field of the Invention

This invention relates generally to combining real world images viewed by a camera with scene elements from another source. More specifically, the present invention provides a method for calibrating a camera and lens such that when computer generated images are incorporated into a real world scene, the computer generated images are always positioned correctly with respect to real world objects.

2. The State of the Art

The state of the art of combining real world imagery with additional imagery provided by another source is a process requiring substantial precision. Typically, the other source of additional imagery is computer generated or some other type of synthetic imagery. Precision is required in the placement of synthetic imagery so that the combination appears realistic when viewed as a whole. For computer generated imagery to be properly placed within a combined scene, a frame of reference must be used in common by the real world and the computer generated imagery.

There are at least two different types of computer generated imagery which can be inserted within a scene of real world imagery photographed or filmed by a camera (where the camera is generally a source of video data). The first type of imagery is where real world objects are disposed in the foreground in front of a studio backdrop background, commonly constructed using a blue or green wall or screen. A synthetic scene is then added in place of the blue or green screen. The second type is where the real world objects appear to be surrounded by the computer generated objects. For example, an animated character is able to seemingly interact with real world characters.

It is often desirable to make live scene elements appear as if they are actually part of the background, and not just standing in front of it. In such cases, it is necessary to know, with considerable precision, enough information about the camera to generate the synthetic scene as if it were really part of the camera's filming environment. A synthetic element generator, or in this case a computer image generator, must know what the camera is "seeing" in order to accurately place the synthetic elements in the scene using a database of virtual information. For the computer image generator to know what the camera is seeing, at least seven parameters must be determined with a relatively high degree of precision. These include the orientation of the camera (also known as the pan, tilt and roll of the camera head), the camera position relative to a three dimensional coordinate axis (also referred to as the XYZ position by those skilled in the art), and the field of view (FOV, also known as the zoom setting).

Regarding the XYZ position, what is more specifically required is the XYZ position of the camera's nodal point. The nodal point is the exact point in space from which the perspective scene which the camera sees appears to be drawn. It is generally at a point along the optical axis of the zoom lens, but its precise position moves forward and back as a function of the zoom and focus settings of the lens. It may move many inches as the zoom and focus controls are operated.

To obtain the pan and tilt information, the camera head is instrumented with sensors which measure the rotation of the camera about the pan and tilt axes of the camera head. This pan and tilt information tells the computer image generator the instantaneous "look direction" of the camera. The roll of the camera head is assumed to be zero for a camera mounted on a pedestal, although that can be instrumental and accounted for as well.

Disclosed in more detail in a patent application by another inventor and filed simultaneously with this document is a method and apparatus for determining the pedestal's (and thus the camera's) XYZ position. The process utilizes a quick and simple alignment procedure utilizing triangulation to known pre-marked studio reference points. The alignment procedure is performed each time the pedestal is moved to a new location. It should be noted that the true "eyepoint" location is determined not only by the pedestal position, but also by how the camera is mounted on the pedestal, and also by the position of the camera/lens nodal point at any particular moment. What is most relevant to this document is a method and apparatus for measuring the camera/lens' nodal point position and field of view, for any setting of the zoom and focus rings on the camera lens. The process for determining the camera and lens nodal point offset and field of view as a function of the lens zoom and focus settings is referred to hereinafter as a lens calibration process.

The state of the art methods for executing the lens calibration process generally rely on very tedious measurements. Specifically, the method generally requires the use of an optical workbench, taking careful measurements, and recording data points manually. The process described above is time consuming, and requires manual measurements and manual entry of data points. Consequently, the process is prone to human error.

The state of the art process is tedious because the camera lens nodal point offset and the field of view must be determined for each zoom and focus setting of the camera and lens. Cameras and lenses to be used in a vertical set provide zoom and focus rings having instrument encoders which provide the ring settings. However, these ring settings do not directly provide the camera lens nodal point offset and the field of view. When the camera and lens are being used in real-time, the nodal point offset (and field of view) is obtained by taking the current zoom and focus ring settings, and processing them using a set of calibration data created specifically for the particular camera and lens. Therefore, each camera and lens combination has a unique calibration data set which must be determined before use. This is a one-time alignment/calibration procedure to create the calibration data set for each particular camera and lens combination. Typically, the calibration process presently takes many hours to perform.

It would be an improvement to provide a new method for measuring camera and lens properties in a lens calibration process which is more automated than the prior art. The new process should also eliminate manual entry of data, thereby reducing the chance for human error in the lens calibration process. The new calibration process should also reduce the time for creating a calibration data set for each camera and lens pair.

OBJECTS AND SUMMARY OF THE INVENTION

It is an object of the present invention to provide a method and apparatus for measuring physical parameters of a camera and lens combination.

It is another object to provide a lens calibration process.

It is another object to provide a lens calibration process which provides three dimensional position information of the camera's nodal point for any setting of the zoom and focus rings.

It is another object to provide a lens calibration process which provides field of view information for any setting of the zoom and focus rings.

It is another object to provide a lens calibration process which determines the camera lens nodal point offset and the field of view utilizing camera lens zoom and focus settings.

It is another object to provide a lens calibration process which includes utilizing components from a virtual studio set to generate the camera lens nodal point offset and the field of view information.

The present invention is realized in a method and apparatus for performing a lens calibration procedure which is executed for each camera and lens pair. The calibration procedure is performed to determine the camera and lens nodal point offset and field of view as a function of lens zoom and focus settings. The method includes the step of providing apparatus which enables the automatic and rapid entry of data points representing lens zoom and focus setting information, thereby eliminating a source of error.

The general method includes the steps of creating a real environment and a virtual environment which is a copy of the real environment, including the front and rear scales to reveal respective parallax with the reference markings. An image is displayed from the real camera on a monitor which includes within the field of view the front and rear scales. Using an image generator to virtually generate a virtual front scale and a virtual rear scale, the image from the virtual environment is superimposed on the monitor displaying the real environment utilizing an image compositor, or by otherwise mixing the real and virtual environment video sources. The camera's zoom and focus rings are operated so as to move through a plurality of values by discrete steps. For each value, the image generator's control's are operated until the pictures are identical. The values from the image generator are then recorded as a data point corresponding to a specific camera lens zoom and focus setting. A plurality of data points are then recorded to create the virtual database.

In one aspect of the preferred embodiment of the present invention, a plurality of vertical lines are marked on a front and a rear horizontal scale, where every dimension of the front scale is half the corresponding dimension length of the rear scale, and where a number of the vertical markings on the front scale is equal to a number of vertical markings on the rear scale. Therefore the distance between the vertical markings on the front scale is half the distance between the markings on the rear scale.

In another advantageous aspect of the invention, the system can be operated in real-time to produce real-time images. The system uses the calibration data points from the virtual database for determining what the correct field of view, nodal point position, and image offset should be for the virtual environment for any zoom and focus setting of the real camera and lens.

In another advantageous aspect, creating the virtual database is further simplified through the use of specialized virtual image generator control software. During the calibration procedure, datapoints are recorded. Instead of manually entering the data, the virtual image generator software provides the necessary data as the field of view, nodal point position and image offset are manipulated to create the identical images. When the real environment and virtual environment images are identical, the user taps a mouse or keyboard which adds the data point settings to a calibration dataset for the known real camera lens zoom and focus settings.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The ultimate objective of the present invention is a method for calibrating a real camera and lens and virtual objects rendered by a "virtual camera" so that the virtual objects can be disposed in a composite image of real and virtual environments. For this to happen, the nodal point position and field of view of the real and the virtual cameras must be the same. Ideally, the resulting composite image can be adjusted in real-time. This camera and lens calibration procedure is necessary because of the variations which exist in camera and lens combinations which make the field of view and zoom characteristics unique to each camera and lens pairing. Therefore, the objective of the lens calibration procedure is to measure two parameters of the real camera and lens system (hereinafter referred to as the camera). The two parameters are the field of view and the nodal point position. As stated previously, the nodal point is the exact point in space from which a perspective scene which the camera "sees" appears to be drawn. The nodal point functions as a common reference point between a real environment and a virtual environment. The field of view is the horizontal angle subtended between the left and right edges of the image seen by the camera. However, it should be realized that the point from which the horizontal angle is measured is not yet known because it is the nodal point. Disadvantageously, the nodal point is not at a fixed position relative to the camera, but instead moves forward or backward along an optical axis, where the optical axis is a line extending co-axially from the camera lens. Generally, it is approximately a center of an image seen by the camera. The nodal point moves forward and backward along the optical axis as a function of changing the zoom and/or focus settings. By measuring how the field of view and the nodal point position of the camera vary as the camera's zoom and focus settings are changed, the real camera is calibrated to the virtual camera.

Figure 1A:
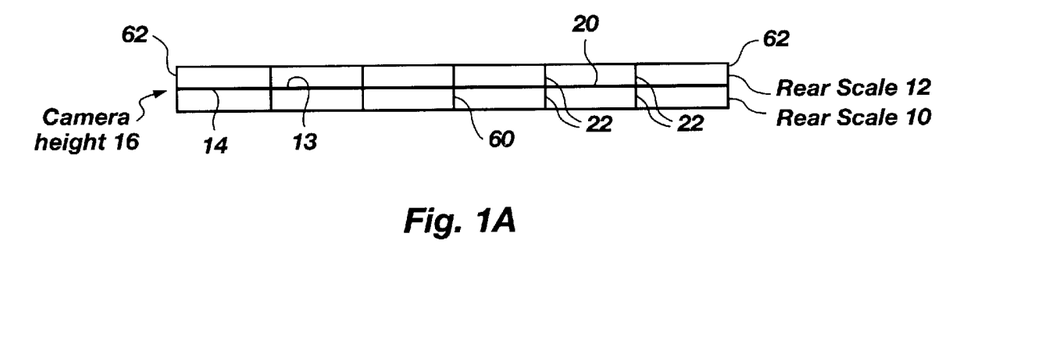
FIG. 1A is a front elevational view of the presently preferred embodiment made in accordance with the present invention, wherein the front scale and the rear scale are shown in a vertical position, and where the distance from the camera lens to the front scale is equal to the distance from the front scale to the rear scale.

FIG. 1A is provided to introduce a set of scales utilized in the preferred method for measuring the field of view and nodal point of the camera. FIG. 1A shows two scales, a front scale 10 and a rear scale 12. The rear scale 12 is mounted generally horizontally on a flat wall with a bottom edge 14 disposed generally at nominal camera height 16. The front scale 10 is suspended at distance D 18 (see FIG. 1B) in front of the rear scale 12. The front scale 10 can be suspended, for example, between two tripods (not shown). The upper edge 20 of the front scale 10 should be disposed so as to appear to be adjacent to or just slightly lower than the bottom edge 14 of the rear scale 12 when viewed through the camera.

The front scale 10 and the rear scale 12 are marked with a plurality of vertical lines 22 at precisely measured intervals. The relative length and vertical line spacing interval relationship between the front scale 10 and the rear scale 12 is that the front scale is exactly half that of the rear scale. Consequently, when the scales 10 and 12 are viewed through the camera as shown in FIG. 1A, the vertical markings 22 of the front scale 10 and the rear scale 12 align generally perfectly as if the length of the scales and the distance between the vertical markings 22 was the same.

Figure 1B:
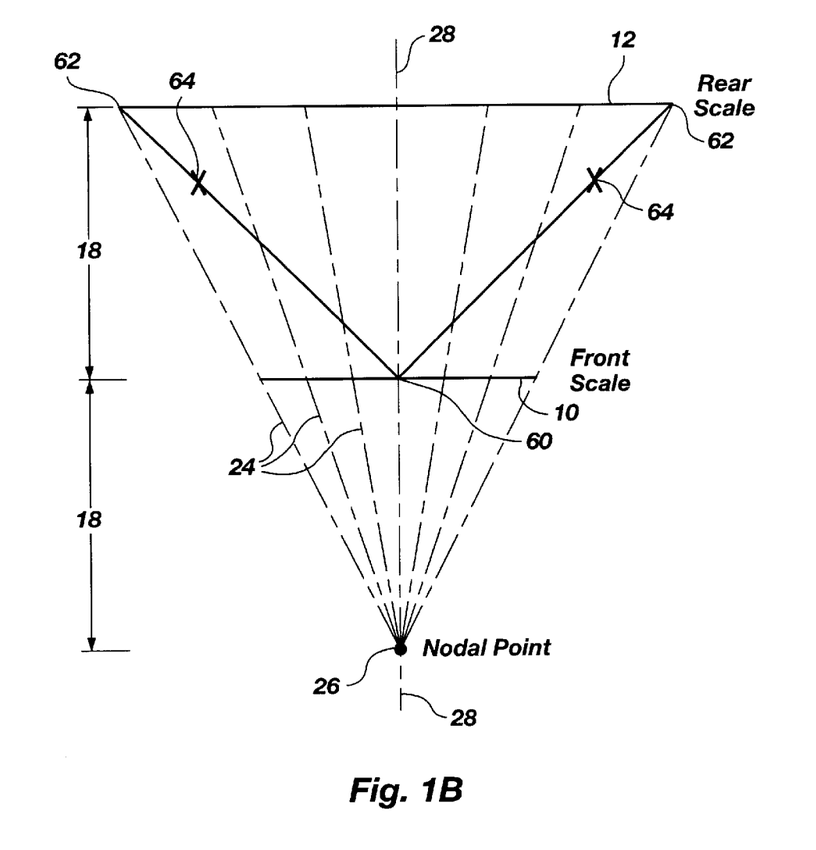
FIG. 1B is a top view of the presently preferred embodiment shown in FIG. 1A, so as to show the nodal point, the front scale and the rear scale.

FIG. 1B illustrates the actual distances between the front scale 10 and the rear scale 12 in a top view. For the vertical markings 22 to align as shown in FIG. 1A, the distances 18 must be the same between the nodal point 26 and the front scale 10, and between the front scale and the rear scale 12. The lines 24 intersect the vertical markings 22 on the scales 10 and 12.

Figure 2A:
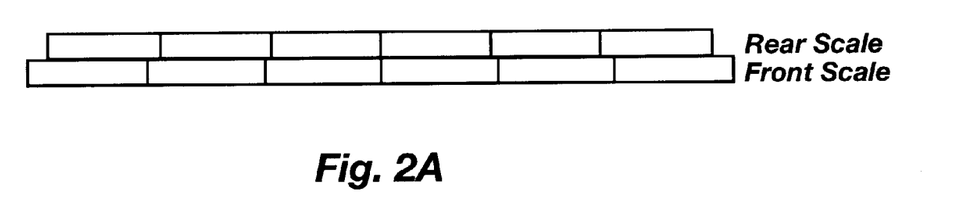
FIG. 2A is a front elevational view of the front scale and the rear scale where the camera's nodal point is closer to the front scale than the front scale is to the rear scale.

The nodal point 26 will change as the camera is moved forward and backward along the optical axis 28. When the nodal point 26 changes, the scales 10 and 12 will no longer appear as shown in FIG. 1A. If the nodal point 26 is moved toward the front scale 10, the scales 10 and 12 can appear as shown in FIG. 2A. In this figure, the front scale 10 now appears to be larger than the rear scale 12.

Figure 2B:
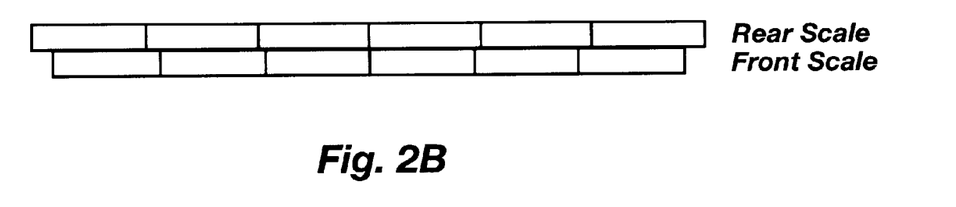
FIG. 2B is a front elevational view of the front scale and the rear scale where the camera's nodal point is further from the front scale than the front scale is the rear scale.

In contrast, FIG. 2B illustrates the situation where the camera is moved backward along the optical axis 28, such that the distance between the nodal point 26 and the front scale 10 is greater than the distance between the front scale and the rear scale 12.

The scales 10 and 12 shown in FIGS. 1A, 1B, 2A and 2B are created for the purpose of providing an image which is to be explained in detail later. However, it is useful to know that two images of the scales 10 and 12 are to be superimposed over each other. One image is from a real environment as seen by the real camera. A second image is a virtual image from the virtual environment which has disposed therein virtual scales which are identical in size, shape and proportions to the scales 10 and 12 found in the real environment.

Because of the sharp and relatively precise edges of the vertical markings 22 and the edges of the scales 10 and 12, the process of determining when the real and virtual images are aligned is made easier.

Moving to the process of creating a virtual environment, a software program known at this time as FuseBox is used to create and control a virtual environment. At least one virtual camera is created so as to create at least one virtual nodal point 30 (not shown). It can be assumed that the layout of the virtual environment is identical to the real environment shown in FIGS. 1A and 1B, and is therefore not redrawn in a separate figure.

Both the virtual and real cameras are placed "on air" to be centered as shown in FIGS. 1A and 1B. A single reference measurement from the rear scale to a point on the camera is recorded in order to compute the offset of each measured nodal point from this referenced point. The at least one virtual camera is able to "see" what is in the virtual environment. Identical props are created within both the real and the virtual environments. For calibration purposes, these props include a virtual front scale and a virtual rear scale.

The presently preferred method of the present invention therefore includes the step of creating the real environment as a set and the virtual environment as a virtual set which is a copy of the real environment, including the virtual front and rear scales with the vertical markings. The next step in the method is to display an image from the real camera on a monitor. Then, the view of the virtual environment is superimposed upon the same monitor so that the virtual environment is seen simultaneously with the real environment. An operator is able to view the monitor and manipulate the image generator's virtual field of view and virtual nodal point position. The task of calibration then involves the step of selecting a first setting for the real camera's zoom and focus rings. The operator manually manipulates the zoom and focus rings to a desired setting. Most importantly, the operator then adjusts the image generator's virtual field of view and virtual nodal point position until the composite image on the monitor showing the virtual environment and the real environment are identical.

Because the image displayed by both the real camera and the virtual camera is of the front and the rear scales (real and virtual), it is a relatively simple matter to align the scales and the vertical markings until they match. A successful alignment of the real and virtual images results in what will appear as a single front and rear scale. When the images agree, the virtual field of view and virtual nodal position are recorded as a data point corresponding to a zoom ring setting and a focus ring setting of the real camera. The ring setting values are simultaneously recorded by the computer software from encoders associated with each ring.

Several observations can be made at this point. First, the recording of the data point is not a manual entry of data. The operator only has to press a key or click a mouse button. Doing so adds the data point to a virtual database where a virtual camera zoom and focus settings and thus nodal point and field of view now correspond to a real camera zoom and focus setting and the resultant nodal point and field of view. It should be realized that because each camera and lens pair is uniquely different from other camera and lens combinations, that the virtual camera zoom and focus settings will vary slightly for each combination.

Second, the method above results in an ability to bring together real and virtual elements with a high degree of precision. This is true even though only a discrete number of data points are recorded. Therefore, the method above also includes the step of moving the real camera zoom and focus settings through a range of values. Ideally, the datapoints are created for many discrete zoom and focus settings on the real camera. However, it should be realized that there are typically thousands of settings available in relatively small increments. The technique therefore includes a method for creating a continuous surface of field of view, nodal point offset, horizontal or vertical image offset values as a function of zoom and focus at real-time rates, based on a relatively small number of data points.

Third, the composite image of the real environment and the virtual environment can be created in numerous ways known to those skilled in the art. For example, the process can be as simple as mixing the real and virtual video sources, instead of using a more sophisticated image compositor device.

Fourth, the specific implementation of the method above is implemented in the FuseBox software. The FuseBox software provides a dialog box for entering datapoints. Specifically, a FuseBox project file is created called "lenscal.fbx" which contains the virtual front and rear scales. After the project is loaded into the image generator, the dialog box enables the operator to enter a file name for storing the calibration results, for the particular camera and lens combination to be calibrated, enter the distance from the rear scale to a selectable camera reference plane, make the virtual nodal position and field of view adjustments for each real camera zoom and focus setting, and for saving the results.

Fifth, it is important to realize that the camera need not be and must not be moved or in any way repositioned between datapoint measurements. It is also not necessary for each data point to be manually written or typed into the FuseBox software. All that is required for each real camera zoom and focus setting is to make the FuseBox control adjustments to match the images from the real camera and the image generator, and then store the settings with a mouse click or keystroke. In other words, the operator "eyeballs" the composite image until it looks like a single image of the scales.

Sixth, manipulating the virtual camera's settings so that the real and virtual images match specifically requires not only adjusting the image generator's field of view and nodal point position, it may also require adjustment of a horizontal and vertical offset to keep the center of the virtual and the real images aligned. Therefore, when the system is utilized to generate real-time images, the field of view, nodal point position and the image offset are all adjusted for any variation of the real camera's zoom and focus settings.

Figure 3:
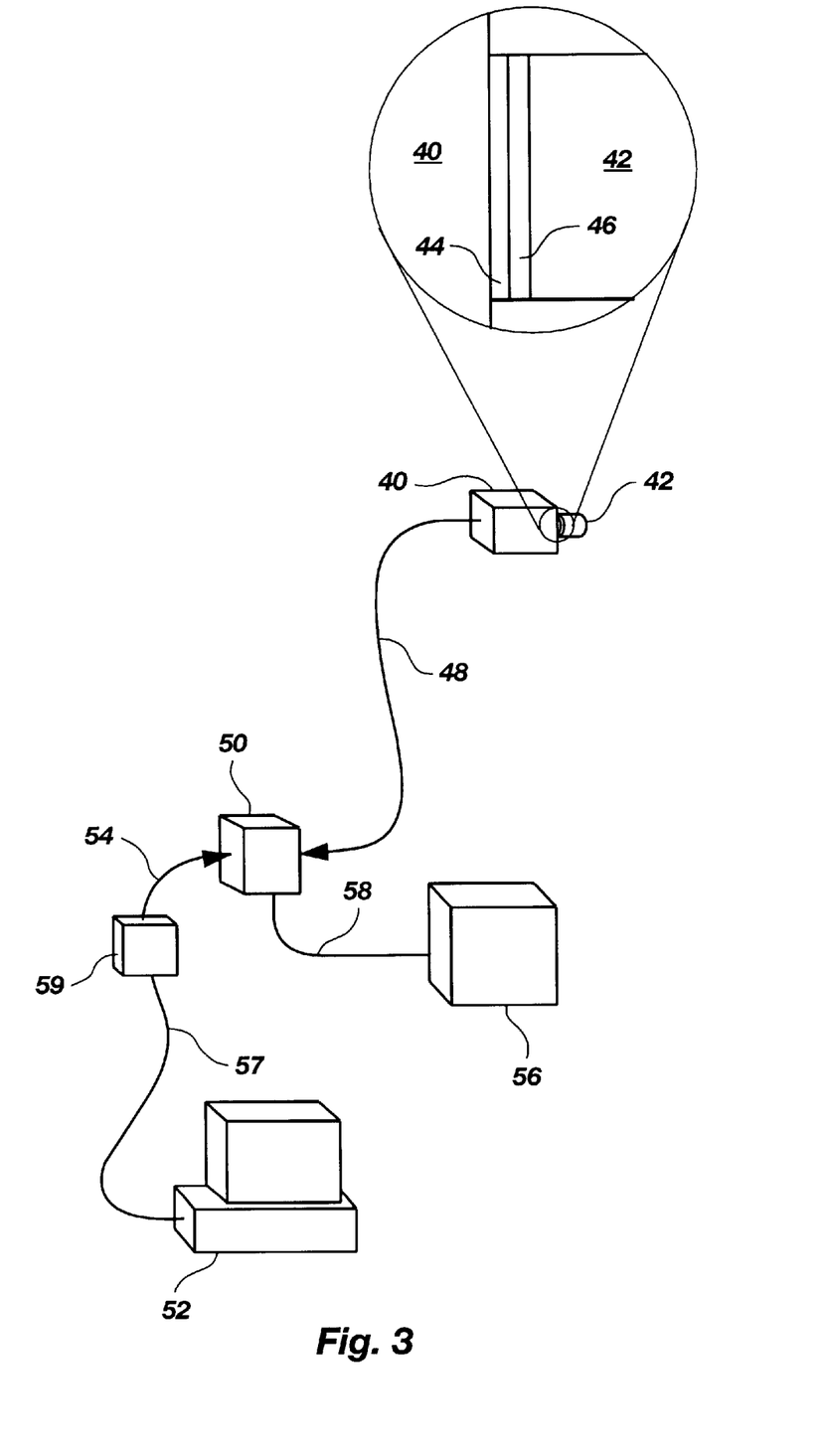
FIG. 3 is a perspective drawing of the physical components of the apparatus of the presently preferred embodiment of the present invention.

The essential hardware elements of the present invention have all been mentioned but not specifically set out. Therefore, as shown in FIG. 3, the present invention includes a real camera 40 and lens 42 having a zoom ring 44 and a focus ring 46. The camera 40 includes a first video cable 48 which transmits the real image to a compositor 50 or other mixing device. The compositor 50 is also coupled to an image generator 59 via a second video cable 54. The image generator 59 is in turn connected to a computer 52 via cable 57, where the computer runs the lens calibration software. In the presently preferred embodiment, the software is known as FuseBox. FuseBox, the computer 52, and the image generator 59 create the virtual environment and the props therein such as the virtual front and rear scales used in the calibration process. FuseBox also controls the field of view and nodal position settings of the virtual camera. Finally, the compositor 50 is coupled via video cable 58 to a display monitor 56 which shows the virtual and the real images concurrently.

Figure 4:
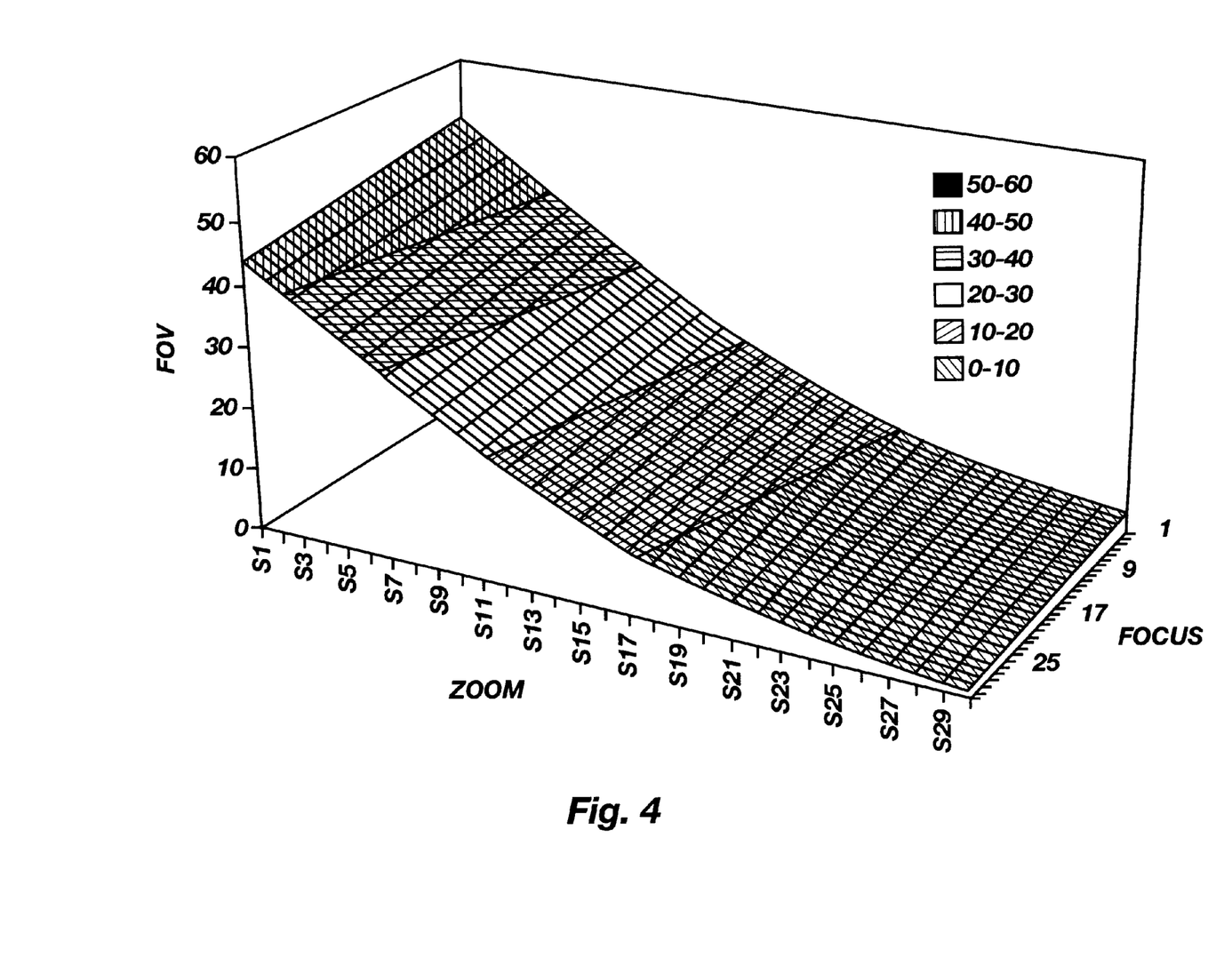
FIG. 4 illustrates a typical plot of the field of view surface for a real camera relative to focus and zoom settings of the real camera.

Ideally, it would seem advantageous to obtain a calibration datapoint for each and every possible zoom and focus setting of the real camera. This is not practical since zoom and focus settings are each measured with tens of thousands of steps of precision. Each camera and lens parameter, for example field of view, can be represented by a surface, as a function of zoom and focus. FIG. 4 shows a typical plot of the field of view surface for a camera. The field of view is shown on a scale from 0 to 60 degrees, with datapoints on each axis ranging through an arbitrarily scaled range of 0 to 30.

Because the surface is obtained utilizing a discrete set of data points, taken at particular values of zoom and focus, it is necessary to provide a function which computes a smooth and continuous surface based on the values measured during the calibration process. A desirable property for this smoothing function is that it passes through the measured values at the particular zoom/focus datapoints. Note that for performance reasons, it may also be desirable to provide a high-speed look-up table version of the smooth surface in an alternative embodiment. This is because surface generating algorithms may be impractical to operate at real-time rates.

While FIG. 4 illustrates a surface for field of view versus zoom and focus settings of the real camera, there are also similar surfaces generated for nodal point offset, horizontal image offset and vertical image offset, all as a function of zoom and focus.

The method described above for the calibration process should enable all those skilled in the art to make and practice the invention. There is additional information, however, which can be of assistance. Therefore, the following information is provided.

When setting up the real front scale 10 and the rear scale 12, it is important that the scales be mounted on rigid and flat surfaces. No sag, bow or curvature should be present. The rear scale 12 should be mounted on a flat wall where it is well lit, and has easy camera access. The front scale 10 can be applied, for example, to a metal bar or other material which will keep the scale 10 straight and flat, without any sag due to gravity.

Ideally in the preferred embodiment, the front scale 10 is mounted exactly 100 centimeters in front of a front surface of the rear scale 12. It is important that the distance of 100 cm be maintained at both the left and right edges and the middle of the scales 10 and 12. The front scale 10 must also be centered relative to the rear scale 12. This can be verified by measuring the diagonal distance between a center tick mark 60 (see FIG. 1B) on the front scale 10 to a pair of tick marks 62 equidistant left and right on the rear scale 12. These two diagonal distances must be the same. These diagonals are marked with a large X 64 in FIG. 1B.

Each scale must also be mounted level to the horizontal. Ideally, the bottom edge 14 of the rear scale 12 should be at the same height as the camera's optical axis 28. The top edge 13 of the front scale 10 should be just slightly lower (about ⅛ of an inch) so that the camera can see the bottom edge 14 of the rear scale 12 without being blocked by the front scale 10.

In an alternative embodiment, an alignment fixture rigidly mounting these scales 10 and 12 utilizing a sturdy sheet of plywood as a base, and mounting the scales to straight lengths of lumber which are attached to the plywood base in the required relative positions could be constructed.

The lighting on the scales 10 and 12 should be adequate to enable a fairly narrow camera iris setting, as this will provide a sharper image over a broad depth of field. If the iris has to be opened too wide, it is more difficult to obtain an adequately sharp image of the vertical tick marks 22 on both the front and rear scales 10 and 12, especially with very narrow zoom angles, and close focus settings.

An important observation about the lens calibration process above involves encoder calibration or initialization. Zoom and focus rings often have encoders which are simply digital representations of a current setting. It is the case with many encoders that there is no index signal. This means that the zoom and focus ring encoders cannot be reset automatically to a known absolute value at a known ring position merely by sweeping the rings through their ranges. Therefore, it is necessary to manually force an absolute value into the encoders after setting the rings to known positions. This involves the steps of 1) moving the zoom ring to is maximum field of view mechanical stop, 2) moving the focus ring to its infinity mechanical stop, and 3) zero the encoder absolute values through the FuseBox Set Properties dialog. In other words, when the rings are moved to an extreme minimum position, the software is told to read whatever random value is on the encoders. Then, the rings are moved to an extreme maximum position, and the software is told to read the value in the encoders which has now been incremented by a certain value. In this way, the software learns what zoom and focus setting is being used relative to the extreme possible positions.

The encoder initialization procedure must be performed before each calibration process. This procedure must also be performed before the camera can be operated after power up.

Another important observation to make is that an important part of lens calibration is to account for the lens's "focus of expansion." In other words, with a zoom lens, there appears to be a single point in the image which is stationary during a zoom operation. Ideally, this point would be the center of the image. However, due to manufacturing tolerances and other factors, this point generally has a small offset, perhaps a few pixels, from the exact center of the image. Furthermore, this point may move slightly during the zoom operation. It is important to know where this point is in the camera's image, so that the image generator can be directed to use this same point as the center of its zoom operations. Otherwise, there would be some slip between the real and the virtual images during a zoom operation.

It is necessary to determine this point experimentally by zooming in and out and observing where this focus of expansion is for a particular camera. One simple method which is generally adequate is to apply a stick-on paper dot on a wall, and then zoom in and out. If the dot is not at the focus of expansion, it will move in screen position as the zoom is manipulated. Using the pan and tilt of the camera, adjust the dot's position until it doesn't appear to move as you zoom. The location of the dot when it does not move is the focus of expansion.

Figure 5:
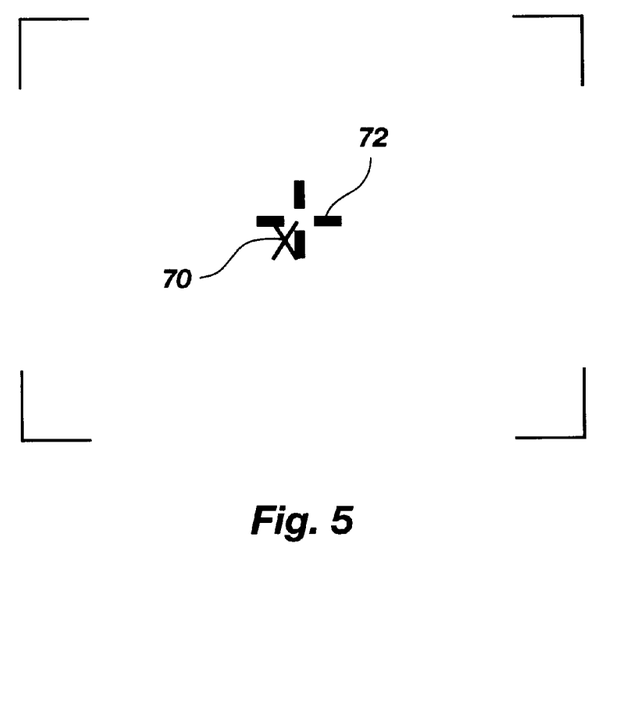
FIG. 5 is an illustration of the focus of expansion being offset relative to the camera's crosshairs.

Many cameras have built-in electronic alignment markers or "crosshairs" which can be turned on. You might wish to turn on the crosshairs, and then determine where the focus of expansion is relative to the crosshairs generated by the camera's markers. For example, in FIG. 5, the focus of expansion is determined to be where the X 70 is marked-slightly to the left and below the camera's crosshair markers 72. Whether or not you have crosshairs 72, you may wish to mark this location, perhaps with a mark on a small piece of tape on the monitor. Remember always to look straight on when using a reference mark on a front surface of the monitor's glass, to avoid parallax errors.

It is important to understand how to line up the camera position and orientation to make correct datapoint measurements. Therefore, it is important that the camera's optical axis 28 is level, and looking exactly toward the bottom center of the rear scale 12, and also with the center vertical tick marks aligned horizontally. To do this, the camera must be at precisely the correct position, with the correct pan and tilt angles. The exact distance from the wall isn't critical. However, it should be close enough that you have a good deal of observable parallax between the front and rear scales 10 and 12, but far enough that the depth of focus of the camera can accommodate both the front and rear scales adequately. It is suggested that the reference plane of the camera be disposed about 2.5 meters from the rear scale 12. The camera should also have a tilt of zero. In other words, it should be level.

Figure 6:
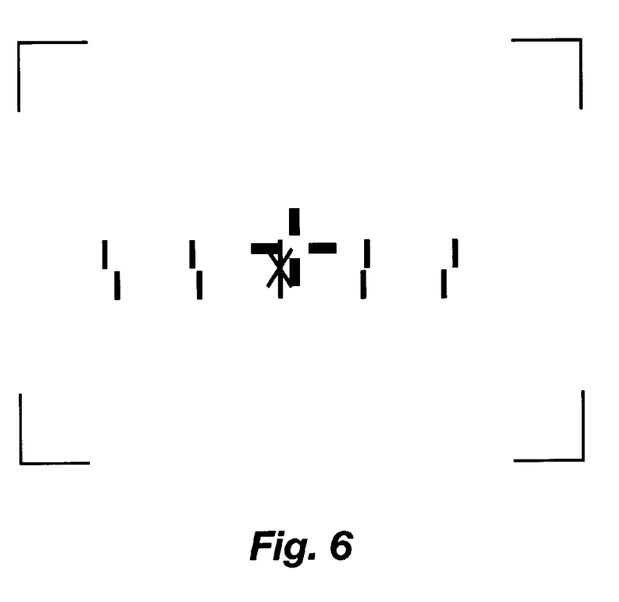
FIG. 6 is an illustration of proper camera alignment for calibration relative to the vertical markings which shows the focus of expansion disposed over the point where the rear scale center marking is adjacent to and aligned with the front scale center marking.

The next step is to line up the camera so that the bottom center of the rear scale 12 is exactly over the focus of expansion, and also aligned horizontally with the center tick marks of the front and rear scales 10 and 12 as shown in FIG. 6. There should be only one way to achieve the desired alignment. In order to reach this condition, it is necessary to iteratively adjust the camera's horizontal and vertical position, as well as the pan and tilt axes.

Once the camera is aligned to achieve the view such as the one shown in FIG. 6, the camera should be locked down so that it can't move during the calibration procedure. After locking down, verify that the picture remains unchanged from the one shown in FIG. 6.

With the virtual images and the real images available, set the compositor 50 so that both the camera and the virtual images can be clearly seen superimposed in the monitor. The distance from the rear scale 12 to the reference place on the camera should now be measured. This distance is entered into the FuseBox software. This value is used to determine the offset from the reference plane to the nodal point, since this value, along with the current field of view, are the values which we wish to measure and store.

The objective of the calibration procedure is to obtain a set of datapoints that covers the range of zoom and focus in a fairly uniform manner. In the preferred embodiment, it is recommended that ten datapoints across the range of both the zoom and focus rings be taken. This results in a total of 100 datapoints. For example, the zoom values might be taken at 0, 11, 22, 33, 44, 55, 66, 77, 88 and 100 percent. The exact values are not critical, but are just chosen to be somewhat evenly distributed throughout the range of each control.

For each zoom and focus setting, there are four controls in the FuseBox software which can be adjusted to bring the two superimposed images into the best agreement possible: nodal point position, field of view, horizontal offset and vertical offset. Adjust the controls until the best possible agreement is obtained between the virtual and real images.

As a practical matter, some focus and zoom settings are more difficult to adjust because the image becomes out of focus. To some extent, this can be improved by using more light and reducing the iris opening, much like squinting helps to focus. Experience has shown that meaningful readings can still be obtained with somewhat blurred lines, as the human eye can do a good job of centering a fuzzy image relative to the image generator.

When the lens calibration procedure of the preferred method is complete, there will be a set of 100 datapoints which characterize the camera and lens combination. The number of data points isn't critical, but of course, the more calibration points which are obtained, the more precise the results will be.

Figure 7:
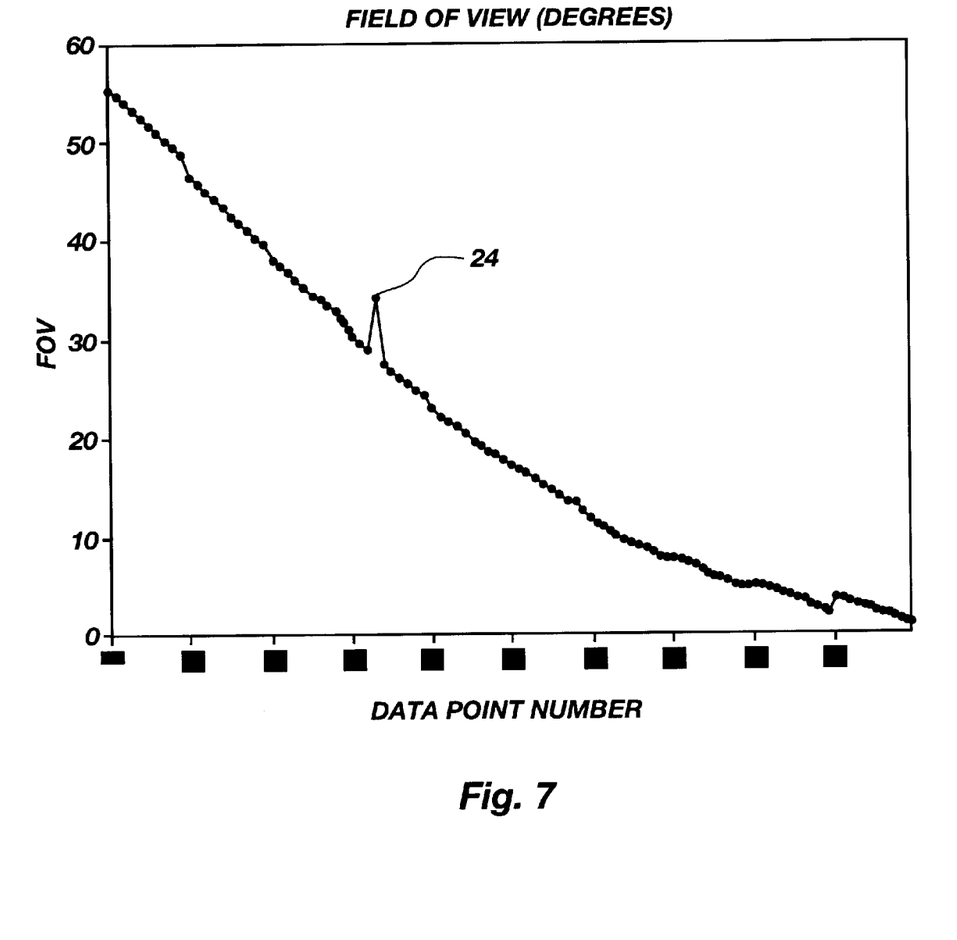
FIG. 7 is an illustration of a plot of field of view data having a questionable data point appearing therein.

It is also possible to analyze and edit the resulting virtual database. While this step is not required, it can serve as a quick quality check of results to make sure that they look reasonable. The calibration results are stored in a computer file. The file can typically be imported into a spreadsheet program. The file format for the preferred embodiment is zoom_value, focus_value, nodal_point_offset, field of view, horizontal offset, vertical offset. Therefore, each line has six numbers. Zoom_value and focus_value are integers, while nodal_point_offset, field of view and the two offset values are floating point numbers. Once the data is imported, the plotting capabilities of the spreadsheet program can be used to graph the results. As shown in FIG. 7, the field of view values are plotted.

FIG. 7 shows that the first data point at the left is the widest field of view with the set on infinity focus. Each group of 10 data points corresponds to a particular setting of the zoom lens. A plot of the data enables a graphical audit where any obviously bad data points can be spotted because they are out of line with the rest of the results. If any data points are out of place such as the datapoint at 74, the datapoint 74 can be remeasured, or a manual correction can be made to the file itself.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

I claim:

1. A method for calibrating a camera and a lens relative to a virtual environment to enable at least two virtual objects to be correctly disposed relative to at least two real objects in combined images of a real environment and the virtual environment, said calibration method comprising the steps of:
   (1) selecting viewing settings of the camera and the lens;
   (2) photographing the real environment through the camera and the lens, and transmitting a first video signal representing the real environment to a common display means;
   (3) generating the virtual environment utilizing a virtual image generator, and transmitting a second video signal representing the virtual environment to the common display means;
   (4) displaying the real environment and the virtual environment as combined images on the common display means;
   (5) arranging at least two objects, where a first object is a front scale and a second object is a rear scale, wherein the front scale is closer to the camera and the lens than the rear scale to align the real environment with the virtual environment;
   (6) adjusting parameters of the virtual image generator until the combined images of the virtual environment and the real environment are generally aligned using the at least two objects aligned with the at least two virtual objects, and recording the viewing settings as a datapoint; and
   (7) repeating steps (1) through (5) to generate a database containing a plurality of datapoints which enable the at least two virtual objects to be disposed at selectable locations within the real environment as seen in the combined images.

2. The method as defined in claim 1 wherein the step of selecting viewing settings of the camera and the lens further comprises the step of adjusting a zoom setting which partially determines a nodal point position of the camera and the lens along an optical axis, and a field of view.

3. The method as defined in claim 1 wherein the method further comprises the step of adjusting a focus setting which partially determines a nodal point position of the camera and the lens along an optical axis, and a field of view.

4. The method as in claim 1 wherein the method is further comprised of the step of creating a first scale which is half as long as the rear scale, and wherein the front scale and the rear scale have an equal number of vertical markings thereon on a front side thereof.

5. The method as defined in claim 4 wherein the method further comprises the step of disposing the plurality of vertical markings such that a distance between each of the plurality of vertical markings on the front scale is half the distance between each of the plurality of vertical markings on the rear scale.

6. The method as defined in claim 5 wherein the method further comprises the step of disposing the rear scale on a generally flat surface, wherein a lower edge of the rear scale is disposed generally at a nominal lens height, and wherein an upper edge of the front scale is disposed so as to appear approximately adjacent to the lower edge of the rear scale when viewed through the camera and the lens.

7. The method as defined in claim 6 wherein the method further comprises the step of aligning a center vertical marking on the front scale with a center vertical marking on the rear scale when viewed through the camera and the lens.

8. The method as defined in claim 7 wherein the method further comprises the step of disposing a visual center of the lens to be level and going through the bottom of the center vertical marking on the rear scale.

9. The method as defined in claim 8 wherein the method further comprises the step of adjusting parameters of the camera and the lens to thereby dispose the visual center of the lens on the fixed point when the visual center moves when the camera and the lens zoom forward or backward along the optical axis when utilizing a zoom function.

10. The method as defined in claim 9 wherein the method further comprises the step of adjusting a horizontal offset and a vertical offset.

11. The method as defined in claim 1 wherein the method further comprises the step of mixing the first video signal and the second video signal to generate the composite image on the common display means.

12. The method as defined in claim 11 wherein the method further comprises the step of mixing the first video signal and the second video signal utilizing a compositor.

13. The method as defined in claim 1 wherein the method further comprises the step of adjusting a virtual nodal point position, a virtual field of view, a virtual horizontal offset and a virtual vertical offset to thereby align the virtual environment with the real environment.

14. The method as defined in claim 1 wherein the method further comprises the step of initializing a zoom ring encoder on the lens by moving a zoom ring to a first extreme setting value and then reading the first extreme value from the zoom ring encoder, and then moving the zoom ring to an opposite extreme setting value and then reading the opposite extreme value from the zoom ring encoder.

15. The method as defined in claim 1 wherein the method further comprises the steps of initializing a focus ring encoder on the lens by moving a focus ring to a minimum setting value and then reading a minimum value from the focus ring encoder, and then moving the focus ring to a maximum setting value and then reading a maximum value from the focus ring encoder.

16. The method as defined in claim 2 wherein the method further comprises the step of adjusting the zoom setting and making datapoint measurements over a generally uniform distribution of a range of zoom setting values.

17. The method as defined in claim 3 wherein the method further comprises the step of adjusting the focus setting and making datapoint measurements over a generally uniform distribution of a range of focus setting values.

18. The method as defined in claim 1 wherein the method further comprises the step of measuring a distance from a rear scale to a reference plane on the camera, where the distance is utilized to determine an offset value from the reference plane to a nodal point.

19. The method as defined in claim 13 wherein the method further comprises the step of generating a mathematically defined surface from a discrete set of datapoints for the virtual nodal point offset, the virtual field of view, the virtual horizontal image offset and the virtual vertical image offset.

20. The method as defined in claim 19 wherein the method further comprises the step of generating a look-up table to represent the mathematically defined surface by resampling the mathematically defined surface at similar or greater density, and then interpolating between the resampled datapoints to thereby enable real-time display of the at least one virtual object within the composite image of the real environment and the virtual environment.

21. A method for calibrating a camera and a lens to thereby enable real-time display of at least two virtual objects which are selectively disposed within a composite image of a real environment and an identical virtual environment, said method comprising the steps of:

(1) generating a database which includes parameter settings for a virtual camera and a virtual lens which correspond to parameter settings for the camera and lens, thereby enabling the virtual camera and virtual lens to be aligned with the camera and the lens;

(2) arranging at least two objects in a real environment, where a first object is a front scale and a second object is a rear scale wherein the front scale is closer to the camera and the lens than the rear scale to align the real environment with the virtual environment; and (2) selectively disposing the at least two virtual objects within the virtual environment utilizing a virtual image generator such that the at least two virtual objects are placed in a location within the composite image corresponding to the location of the two objects in the real environment.

22. A method for calibrating a camera and a lens to thereby enable a virtual image generator to generate at least two virtual objects which are then utilized to create a composite image of a real environment and a virtual environment which contains the at least two virtual objects, said method comprising the steps of:

(1) disposing at least two objects utilizing the camera and the lens where a first object is a front scale and a second object is a rear scale, wherein the front scale is closer to the camera and the lens than the rear scale to align the real environment with the virtual environment,;

(2) photographing the at least two objects utilizing the camera and the lens, and transmitting a video signal of the at least two objects to a common display means;

(3) generating a virtual environment identical to the real environment as seen by the camera and the lens;

(4) displaying a composite image of the at least two objects from the real environment and a virtual copy of the at least two objects from the virtual environment;

(5) adjusting parameters of the virtual image generator until the at least two objects and the virtual copy of the objects are generally aligned to display one image of the objects;

(6) recording the parameter of the virtual image generator which resulted in the aligned image, wherein the parameters create a data point;

(7) varying parameters of the camera and the lens to produce a different image of the at least two objects; and (8) repeating steps (4) through (7) to generate a database containing parameters of the virtual image generator which enable the at least two virtual objects to be disposed at a selectable location within the real environment as seen in the composite image.

* * * * *